United States Patent [19]
Rockett et al.

[11] 3,802,909
[45] Apr. 9, 1974

[54] BONDING OF ORGANIC MATERIALS TO INORGANIC PARTICLES

[75] Inventors: Thomas J. Rockett, East Greenwich, R.I.; Alfred R. Doig, Hyde Park, Mass.; Stanley Komatsu, Laguna Hills, Calif.; John Evans, Malden, Mass.; John J. O'Connell, Santa Ana, Calif.

[73] Assignee: American Hospital Supply Corporation, Evanston, Ill.

[22] Filed: Nov. 9, 1971

[21] Appl. No.: 197,162

[52] U.S. Cl....117/100 B, 117/54, 117/62.1, 117/81, 117/100 S, 117/123 C, 117/124 D, 117/164
[51] Int. Cl.............................................. B44d 1/092
[58] Field of Search ........ 117/100 S, 100 B, 100 M, 117/49, 62.1, 123 C, 54, 164, 109, 81, 124 D, 8, 118; 241/15, 22, 27, 29, 30; 106/91

[56] References Cited
UNITED STATES PATENTS

| 3,325,105 | 6/1967 | Veltman | 241/15 X |
| 2,578,605 | 12/1951 | Sears et al. | 117/100 S |
| 2,717,852 | 9/1955 | Stone | 195/63 X |
| 3,556,945 | 1/1971 | Messing | 195/63 |
| 3,358,937 | 12/1967 | Pearson et al. | 241/15 |
| 2,476,957 | 7/1949 | Brenner et al. | 117/164 |
| 2,516,685 | 7/1950 | Douty et al. | 117/49 |
| 2,073,666 | 3/1937 | Wernlund | 117/164 |
| 3,492,149 | 1/1970 | Zisman | 117/54 X |
| 2,228,019 | 1/1941 | Scripture | 106/91 |

*Primary Examiner*—William D. Martin
*Assistant Examiner*—Shrive P. Beck
*Attorney, Agent, or Firm*—Dawson, Tilton, Fallon & Lungmus

[57] ABSTRACT

A process for chemically bonding an organic material directly to the surfaces of inorganic particles. The inorganic compound is frangible and is mechanically fractured in the presence of the coating material, under essentially non-aqueous conditions, so that the freshly formed chemically active surfaces are instantly exposed to the coating material to bond chemically therewith.

9 Claims, No Drawings

BONDING OF ORGANIC MATERIALS TO INORGANIC PARTICLES

BACKGROUND

Efforts have been made in the recent past to attach enzyme and other organic materials directly to inorganic carriers in single-step operations which do not employ the use of coupling agents. Thus, U.S. Pat. No. 2,717,852 describes the adsorbtion of enzymes upon a variety of carriers such as activated carbon, clays, and silicates, and U.S. Pat. No. 3,556,945 discloses the use of porous glass as a carrier upon which the enzyme molecules may be held by somewhat stronger attachment forces. In either case, a main objective is to immobilize the enzymes without destroying their activity and specificity. Because of their immobilized condition, such enzymes may be used and reused over extended periods for a variety of laboratory and industrial applications.

SUMMARY

This invention is concerned with a particularly effective and relatively inexpensive process for chemically bonding proteins and other organic materials directly to any of a wide variety of inorganic materials. Such inorganic materials must be solid, frangible compounds in which the bond strength of the constituents is greater than the strength of attractive forces such as Van der Waals' forces. It is a characteristic of such a material that upon fracture, a major portion of the activity of the freshly exposed surface will degrade rapidly, virtually instantly, upon exposure to moisture and/or air. The process of the present invention must therefore be carried out under essentially non-aqueous conditions and preferably in an inert atmosphere.

The process involves the steps of fracturing such an inorganic material and simultaneously exposing the surfaces as they develop to an organic material having functional groups capable of reacting with the surface species to form chemical bonds therewith. Such intimate mixing of the reactants is effectively achieved in a milling chamber, particularly the chamber of a ball mill, over a sufficient time period so that the coated particles fall within the preferred average size range of about 0.5 to 100 microns.

Following thorough washing, the coated particles are then exposed to conditions favoring the further interaction, reaction, or catalytic action of the organic coating with some other substance or agent. Thus, the organic coating may in turn be covalently bonded to another organic material, one which is either biologically active or inactive. Where a biologically active material is involved, either as the original organic coating or as a subsequent coating, the particles may be used in columns for purifying, concentrating, and separating fluids containing enzymes and other organic materials capable of reacting with the coating composition.

DESCRIPTION

The inorganic carrier or base material suitable for use in practicing the method of this invention may be any of a wide variety of crystalline and amorphous compounds or elements which are frangible and which present highly reactive surfaces upon fracture. In general, such materials are substantially insoluble in water, have relatively high melting points (above 200° C.), and have a hardness or brittleness that permits the mechanical fracturing or shearing essential to performance of the process. Such physical characteristics all suggest bonds of relatively high strength between the constituents of the carrier compounds. Such strength, as already indicated, is of the order of ionic, coordinate, and covalent bonds.

The inorganic carrier may be a glass such as silica glass, high alumina glass, sodium borosilicate glass, or glassy carbon, or it may be a crystalline compound such as zirconia or feldspar. Furthermore, the compound need not be an oxide; halides such as calcium fluoride may constitute effective base materials in carrying out the process of the invention.

It is essential that the inorganic compound be capable of being comminuted by milling or by physical impact forces into particles of relatively small size having the surface activity described above. In general, the average size of the carrier particles as finally coated by the process of the invention shall fall within the range of 0.1 to 200 microns, depending on the nature of the material, the character of the coating, and the use to which such particles are to be put. Particularly effective results have been achieved with particles having an average final size within the range of 1 to 100 microns.

The organic material used to coat the carrier particles may be any of a wide variety of compounds capable of interacting with the freshly formed surfaces. Ordinarily, the organic material will be a finely divided solid; however, liquids such as ethylene glycol, toluene and octanoyl chloride have been found effective and gaseous coating agents can also be used. Proteinaceous materials, particularly albumin, gamma globulin and other blood proteins are particularly suitable. Enzymes may be immobilized (insolubilized) and stabilized upon the activated surfaces of the inorganic particles, such enzymes being any of a wide variety of hydrolytic, redox, and transferase enzymes. Thus, hydrolytic enzymes such as papain and redox enzymes such as glucose oxidase have been immobilized by this process. The enzyme papain has in addition been stabilized by this process.

The process involves fracturing, under essentially non-aqueous conditions, the frangible inorganic compound so that as freshly fractured surfaces are formed they are immediately exposed to the reactive organic material in admixture therewith. During the process, the coating and carrier materials are intimately mixed, and the active bonding sites on the freshly fractured surfaces are immediately and directly exposed to the organic coating material before the surface activity of the particles has degraded. To insure that chemical bonds of the order of strength of ionic, coordinate and covalent bonds will be formed, it is essential that the fracturing and mixing steps be undertaken in a substantially non-aqueous environment, that is, in an environment in which no separable aqueous phase is present and preferably one which is essentially anhydrous.

It has been found that the simultaneous fracturing and mixing steps may be effectively performed in a milling chamber, specifically, in the chamber of a conventional ball mill. To insure sufficient exposure between the freshly fractured surfaces and the coating composition, and to achieve the advantages of high surface area which particle size reduction provides, we commence milling with inorganic particles having an average size of at least 0.1 mm (usually of an average size of 1.0 mm or more) and continue milling for an interval which results in a reduction to the particle size range previously indicated. An extended milling time is therefore required; in genral, such milling is performed over an interval of at least 1 hour and may be continued for 100 hours or more.

The chamber of a conventional ball mill is ordinarily sealed during operation and such a sealed condition is believed to be of at least some significance in limiting exposure of the active surfaces of fracture to air (oxygen) and moisture. Temperature is not critical except to the extent that elevated temperatures might inactivate or alter the organic composition and destroy its usefulness as a biologically active coating for later use in the laboratory or in industry.

Following the fracturing and mixing procedure, the coated particles are washed free of unbonded coating material until the effluent gives no indication of the organic solute. The particles with their insoluble coating are then exposed to agents capable of reacting with the coating material or with other materials in the presence of such a coating. Thus, the coated particles may be used as fillers for plastics, the coating serving as a coupler between the finely divided glass (or other inorganic filler) and the resin to increase the compatibility of the resin and glass and to permit greater loading of the resin without concomitant loss of strength. Even in those instances where the physical characteristics of the filled plastic may not be substantially superior to those of the same plastic filled by conventional techniques, the strength of the bond between the organic coating and the inorganic carrier nevertheless insures that the coating will be non-leaching and non-migrating — characteristics which may be of considerable importance where such filled plastics are to be used in the medical field and other selected fields.

Where the organic coating is biologically active, that activity may be utilized in purifying, separating and concentrating fluids containing enzymes, antigens, antibodies, and other organic materials. It has been found, for example, that papain may be chemically bonded to glass particles by the method of this invention, the papain retaining its enzymatic activity for further reaction with other substances. The immobilized papain may thus be reacted in a column with the residual protein of beer in order to clarify the beer (by removal of the protein haze) without at the same time introducing papain into the final product. While treatment of beer with papain is a well known procedure, such treatment normally involves adding the papain to the beer where it remains as a dissolved ingredient for the consumer, a practice not universally considered acceptable or economically attractive.

As examples of other uses of the inorganic particles with their biologically active and stabilized organic coatings, such particles may be used in the purification of enzymes, the purification of complementary peptide fragments, the concentration of enzyme solutions, the removal of denatured forms of pure enzyme solutions, the separation of enzymatically inactive subunits or mutant enzyme forms, the separation of mixtures of chemically modified enzymes, the purification of antigens and antibodies, the purification of hormone-binding proteins, the purification of sulhydryl proteins, the purification of enzyme inhibitors, the purification of nucleic acids, the separation of lymphocyte and cell populations, and the purification of ribosomal structures. In all such instances, the organic coating is reacted in its immobilized condition with some other organic material requiring purification, concentration, or other treatment.

With respect to retention of biological activity, it has been found that extending the period of milling some proteinaceous coating materials with the frangible carrier materials increases the extent of bonding but reduces the biological activity of the coating. Such disadvantages may be controlled by adjusting the duration of the milling time to avoid undesirable inactivation of the particular enzyme or other coating material involved, or by utilizing the process of the invention to first bond a enzymatically inactive organic material such as albumin to the carrier particles and then, after an optimum amount of albumin has been bonded chemically to the particles and the particles have been washed thoroughly with an appropriate solvent, treating the coated particles with a suitable coupling agent and covalently bonding an appropriate biologically active material to the albumin coating. Bifunctional reagents which may be used as coupling agents are: toluene-2,4-diisocyanate, 1,5-difluoro-2,4-dinitrobenzene, 4,4'-azobenzene disulfonyl chloride, 4,4'-difluoro-3,3'-dinitrodiphenylsulfone, bis-diazobenzidine, bis-diazohexane, N,N'-(1,2-phenylene) bis-maleimide, phenol-2,4-disulfonyl chloride, m-xylylene diisocyanate, glutaral-dehyde, dimethyl adipimidate, epichlorohydrin, and toluene-2-isocyanate-4-isothiocyanate.

The invention is further revealed by the following illustrative examples:

EXAMPLE 1

An animal protein, rabbit gamma globulin, was bonded to glass particles by the method of this invention as follows:

The selected inorganic carrier was a high alumina glass having the composition (by weight percent) of $42Al_2O_3:21SiO_2:16CaF_2:16P_2O_5:2.5K_2O:2.5Li_2O$, and having an average particle size (prior to milling) of approximately 20 mesh. One hundred parts (by weight) of the glass powder were ball milled with two parts rabbit gamma globulin for 120 hours at ambient temperature using alumina balls in the mill. Four 100 milligram (mg) samples were prepared by washing three times with 3 milliliters (ml) of 0.85 percent saline, pH 5.5, per wash. Protein determinations on the supernatant saline revealed traces too small to be quantitated on the third washing.

The following immunological tests run on the four samples revealed that the protein attached to the glass particles retained its biological activity. The first sample of 100 mg was incubated with 0.5 ml normal human serum for 1 hour at room temperature with constant agitation. Protein determinations on the normal human serum revealed 6.1 mg/ml protein before adsorption and 5.2 mg/ml after adsorption. Immunoelectrophoresis revealed a decrease in albumin and gamma globulin in the adsorbed serum as compared with a control. That only a slight decrease in he protein of the serum occurred indicates that the rabbit gamma globulin bound to the glass particles retained its specificity.

The second 100 mg sample was incubated with 0.5 ml normal rabbit serum for 1 hour at room temperature with constant agitation. Protein determinations revealed 5.7 mg/ml protein in the serum before adsorption and 5.3 mg/ml after adsorption. The fact that no appreciable change occurred, and that immunoelectrophoresis revealed no difference between the adsorbed serum and the unadsorbed serum used as a control, indicates that the gamma globulin retained enough of its essential character so as not to be treated as a foreign substance by the rabbit serum.

The third 100 mg sample was incubated with 0.5 ml of equine anti-rabbit serum for 1 hour at room temperature with constant agitation. The equine anti-rabbit serum had been previously prepared by injecting rabbit gamma globulin into a horse and then, after a period of 2 weeks had elapsed, withdrawing and isolating a sample of the equine serum which then contained antibodies to rabbit gamma globulin.

Protein determinations on the engine serum revealed 8.9 mg/ml protein before adsorption and 0.8 mg/ml after adsorption. Immunoelectrophoresis using both the adsorbed and unadsorbed equine anti-rabbit serum against normal rabbit serum as antigen revealed a decrease in the antibody content of the adsorbed equine anti-rabbit serum. Those antibody decreases were directed primarily against the IgG and the B globulins of the normal rabbit serum although some decrease was noted in albumin as well. Ouchterlony titers were done on both the adsorbed and unadsorbed equine anti-rabbit serum using rabbit gamma globulin (1 gm percent) as antigen. The unadsorbed material had a titer of 1:32 while the adsorbed had a titer of 1:16. The results of this test, revealing that a substantial amount of the protein in the horse serum complexed with the gamma globulin of the coated particles, indicate that the antigenic coating of the particles retained both its activity and its specificity.

Further indications of retained specificity appeared in the fourth set. The fourth 100 mg sample was incubated with 0.5 ml of rabbit anti-human serum for 1 hour at room temperature with constant agitation. Protein determinations revealed 9.1 mg/ml protein before adsorption and 7.5 mg/ml after adsorption. Immunoelectrophoresis using both the adsorbed and unadsorbed rabbit anti-human serum against normal human serum as antigen revealed no change in the antibody content of the adsorbed serum as compared to the unadsorbed as a control. Ouchterlony titers were done on both the adsorbed and unadsorbed rabbit anti-human serum using human gamma globulin (1 gm percent) as antigen. The unadsorbed material had a titer of 1:4 while the adsorbed had a titer of 1:4.

EXAMPLE 2

A representative proteolytic enzyme, papain (Sigma Chemical Company) was bonded to an inorganic carrier in accordance with the process of the invention as follows:

The selected inorganic carrier was Pyrex glass power having the approximate composition (weight percent) of $80SiO_2:11B_2O_3:4Na_2O:3Al_2O_3:2(CaO, MgO, K_2O)$. The ratio of organic coating material to inorganic carrier for each test set forth below as 50 mg papain per gm of glass. In all experiments, the ball mill jars were filled to approximately one third their capacity with balls and inorganic-enzyme mix.

Following ball milling, all unreacted enzyme was removed from the inorganic substrate by washing with isotonic saline. The washing procedure consisted of placing a 5 gm aliquot of the ball milled mix in a beaker with 200 ml saline, then agitating the mixture for 5 minutes, and then filtering with a Millipore filter. For each sample such washing procedure was repeated a total of five times. The coated inorganic material was then dried by placing it in a dessicator overnight. Approximately 10 ml of each filtrate were also retained in order to determine the enzyme content in the wash solution.

The enzyme activity of the coated particles was evaluated by the potentiometric determination of the acid produced during the hydrolysis of $N\alpha$-benzoyl-L-arginine ethyl ester. A Radiometer Titrograph was used to carry out the assay. The results given in the following table are in units of milligrams enzyme activity per gram of inorganic substrate.

The amount of papain (enzymatically active and/or inactive) bonded to the inorganic particles was determined by the Kjeldahl method. Using that procedure, the nitrogen in the papain was converted to ammonia which was absorbed in acid. The acid was then back titrated to determine the amount of nitrogen evolved. A micro Kjeldahl apparatus was utilized and the results were found reproduceable. Interfering side reactions due to the presence of the inorganic particles were not observed. Thus, no nitrogen was found in a sample which had been ball milled without papain.

The amount of papain dissolved in the wash solvent was determined by the Lowery spectrophotometric method. As expected, the amount of papain in the wash solvent progressively decreased with each successive wash. Usually no papain was detected in the filtrate from the fourth wash.

| Milling Time Hours | Enzyme Activity mg/gram | Kjeldahl Analysis of Glass mg/gram |
|---|---|---|
| 24 | 0.46 | 1.2 |
| 48 | 0.10 | 9.4 |
| 96 | (+) | 16.1 |
| 192 | (−) | 25.0 |

It will be observed that the amount of enzyme attached to the inorganic substrate increased with ball mill time. However, ball milling the enzyme-inorganic substrate for long periods resulted in the deactivation of the enzyme.

EXAMPLE 3

The process described in Example 2, using papain as a representative enzyme, was reproduced using glassy carbon instead of Pyrex glass. A ratio of 100 mg papain per gram of substrate was used. The following results were obtained:

| Milling Time Hours | Enzyme Activity mg/gram | Kjeldahl Analysis of Glass mg/gram |
|---|---|---|
| 24 | 1.3 | 6.1 |
| 48 | 0.26 | 9.5 |
| 95 | (−) | 9.5 |
| 192 | (−) | 14.0 |

EXAMPLE 4

The following experiments illustrate the bonding of a representative redox enzyme, glucose oxidase, to inorganic particles by means of the described process.

The material used was a commercial powdered silica (Howe and French). Glucose oxidase (Sigma Type II) was combined with the powdered silica in a 5/95 weight ratio and ball milled for 192 hours at approximately 25° C. Following milling, 5 gm of the finely divided and coated silica were washed with 145 ml of normal saline (0.85% NaCl). A sample of each 145 ml wash was kept, as well as a wet glass sample. The remainder of the glass was dried at room temperature under vacuum (1 day, using $CaCl_2$ as the dessicant).

The wash solution was analyzed by the Lowery method for protein and the silica sample was analyzed by the Kjeldahl method for nitrogen (protein). Finally, the silica and wash were analyzed for enzymatic activity by the Weetall-Hersh method.

In the activity assay, the dye was adsorbed on the silica particles and no quantitative data could be obtained. Also because of the small quantity of enzyme activity the color was noted after one hour and one day rather than five minutes as in the reference method [Weetall, H. H., Hersh, L. S., Biochem. Biophys. Acta 206,54 (1970)]. The results are summarized as follows:

| Enzyme Activity Silica | Kjeldahl Analysis mg/gram |
| --- | --- |
| Wet (+) | 18.0 |
| Dry (−) |  |

The results reveal substantial bonding of the enzyme to the silica with activity on the wet powder which could not be quantitatively determined.

To compare the above results with attachment by simple adsorption, a sample of the same silica powder was mixed with glucose oxidase in approximately the same ratio (50 mg glucose oxidase per gram of silica) without any ball milling. Ten ml of water were added to the mixture and stirring was continued for 15 minutes. The following results demonstrate that while some enzymatic activity appeared on the silica following the washing steps previously described, a far greater proportion of the enzyme was washed off of the silica powder:

| Enzyme Activity Silica | Kjeldahl Analysis mg/gram |
| --- | --- |
| Wet (+) | 2.9 |
| Dry (−) |  |

EXAMPLE 5

The relative strength of the bond formed between comminuted inorganic carriers and the organic coating materials as a result of this process, as compared with physical attractive forces, is further revealed by the following:

Papain and albumin (Sigma Chemical Company) were used as representative proteins for the organic coating materials and powdered Pyrex glass [approximately $80SiO_2:11B_2O_3:4Na_2O:3Al_2O_3:2(CaO,MgO,K_2O)$] was used as a representative carrier. For each sample, the ratio of 50 mg protein to 1 gm powdered glass was used. The tests were conducted in pairs. One test of each pair involved impact fracturing (by ball milling) the glass at ambient temperature for a total of 107 hours in admixture with the protein. The other test of each pair involved ball milling the glass for the same length of time in the absence of the protein, and then mixing the finely divided ball-milled glass (1.5 grams) with the protein in aqueous solution (10 ml aliquots containing either 7.5 mg papain or 12.0 mg albumin). In other respects the tests of each pair were identical.

In those tests in which the protein in aqueous solution was mixed with the substrate following completion of the ball milling, the ingredients were stirred for 10 minutes in the presence of a suitable buffer (solvent), then centrifuged, and the supernatant then read on a spectrophotometer at 280 m$\mu$ until a zero reading was obtained. In each companion test, the same buffer solution was mixed with the ball milled substrate-protein and then centrifuged with the supernatant being read at the same wavelength. Protein bound to Pyrex was determined by the Folin-Ciocalteu method.

The results with albumin as the coating material were as follows:

Albumin Tests

| Washing Solution | Mg Protein Bound/gr. Pyrex when Carrier Milled with Protein | Mg Protein Bound/gr. Pyrex when Carrier Milled Separately and then Mixed with Protein |
| --- | --- | --- |
| 0.005 M NaCl pH 6.7 | 6.3 | 0.5 |
| 0.02 M NaCl pH 6.7 | 5.2 | 0.5 |
| 0.2 M NaCl pH 6.7 | 5.8 | 0.3 |
| 0.2 M NaCl+0.1% Sodium dodecyl Sulfate (detergent) pH 6.7 | 3.7 | 0.1 |

It will be observed that considerably greater amounts of protein remained on the carrier particles in the first series of tests involving the process of the invention and that the bonding strength was sufficient to withstand exposure to a solvent containing a strong detergent (sodium dodecyl sulfate). Similar results were obtained using papain instead of albumin, although the tests were not as extensive:

Papain Tests

| Washing Solution | Mg Protein Bound/gr. Pyrex when Carrier Milled with Protein | Mg Protein Bound/gr. Pyrex when Carrier Milled Separately and then Mixed with Protein |
| --- | --- | --- |
| 0.005 M NaCl pH 6.7 | 5.0 | 1.5 |
| 0.2 M NaCl pH 6.7 | 5.0 | 3.0 |
| 2.0 M NaCl pH 6.7 | 11.7 | 0.5 |

While the precise nature of the bonds which secure the coating materials to the carrier particles when such particles are fractured by milling in the presence of the coating composition is not fully understood, it is believed apparent from the above that such bonds are of a high magnitude of strength; specifically, that the phenomenon is not merely one of adsorption but that bonds of the order of strength of covalent, coordinate, or ionic bonds are formed.

EXAMPLE 6

The following example illustrates that an enzymatically inactive coating (albumin) upon inorganic carrier particles (Pyrex glass) may provide a suitable support for a secondary coating (mercury papain) which is enzymatically active.

Pyrex glass powder was first milled with albumin as set forth in Example 5 so that the albumin coated the freshly formed activated surfaces of the glass particles. The coated particles were then washed with 0.2 M NaCl containing 0.1 percent detergent (sodium dodecyl sulfate). After centrifugation, 2,000 mg of the residue (albumin-coated particles) were mixed with 20 ml of 0.01 M tris buffer [tris(hydroxymethyl)aminomethane] in HCl (pH 7.8) and 25 mg 1,5-difluoro-2,4-dinitrobenzene were added. After 90 minutes at room temperature, the excess reagent was removed by centrifugation and the residue was washed three times with 0.01 M tris-HCl buffer (pH 7.8). Thereafter, 16 ml of the tris-HCl buffer (pH 7.8) were added to the washed residue and aliquots each containing 4 ml and 500 mg of coated glass particles were placed in three tubes.

Mercury papain was then added to each of the tubes in the amounts of 5, 10, and 20 mg, respectively. After 90 minutes at room temperature, excess mercury papain was removed from each tube by centrifugation, the coated particles in each tube were washed three times with 20 ml of 0.2 M NaCl, the supernatant and the residue were assayed with N$\alpha$-benzoyl-L-arginine ethyl ester, and the samples of coated particles were dried. The following results were obtained:

| Sample | Mg of Hg Papain per gm Glass Albumin | Mg Papain/gr. Pyrex Bound | Percent Activty* Recovered | Percent Specific Activity** |
|---|---|---|---|---|
| 1 | 10 | 7.7 | 44 | 57 |
| 2 | 20 | 19.5 | 48 | 49 |
| 3 | 40 | 35 | 65 | 70 |

*Total units of sodium hydroxide added
**Total units of sodium hydroxide added per mg papain The activity of the secondary papain coating, coupled to the primary albumin coating of each inorganic particle by the procedure described above, was further demonstrated by exposing such particles to denatured casein (1 percent solution of denatured casein in pH 6.2, 0.1 M phosphate buffer). The residual activity of the papain coating was sufficient to hydrolyze the casein substrate, such residual activity being found to be about 12.5 percent.

EXAMPLE 7

Stearic acid ($C_{17}H_{35}COOH$) is representative of a further organic coating material which may be bonded to freshly formed surfaces of inorganic carrier particles by the process of the present invention.

A high alumina glass powder having the approximate composition (weight percent) of $42Al_2O_3:21SiO_2:16CaF_2:16P_2O_5:2.5K_2O:2.5Li_2O$ was first comminuted in a ball mill for 69 hours. Thereafter, dry stearic acid (in the ratio of 20 mg acid per gram carrier material) was added to the mill and milling was resumed for an additional 169 hours, bringing the total milling time to 238 hours. After removal from the mill, the coated particles were mixed with phosphoric acid which would normally wet the uncoated surfaces of the glass; however, because of the hydrophobic stearic acid coating, no wetting occurred.

In an effort to remove the stearic acid coating from the frit powder, the frit was washed with acetone but, after drying, the coated particles still resisted wetting by water and by phosphoric acid. Thereafter, the frit was placed in petroleum ether and boiled for several hours. It was then filtered in a Buchner funnel and washed several more times in hot petroleum ether. The strength of the bond between the organic coating (stearic acid) and the carrier particles is indicated by the fact that even after such treatment the frit could not be wetted by either water or phosphoric acid.

For purposes of comparison, a like quantity of the same glass powder was milled in a ball mill for 238 hours without any exposure to stearic acid. Thereafter, the frit powder was exposed to water and to phosphoric acid, both of which easily wet the uncoated glass particles.

As previously described, such inorganic particles coated with stearic acid may be used as a filler for synthetic resins wherein the stearic acid moiety acts to increase the compatability of the glass with the resin and thus permit greater loading of the resin without concomitant loss of strength. In order to evaluate the effectiveness of the reacted stearic acid in coupling to polyethylene, samples of high alumina glass particles coated as above with stearic acid, and plain alumina glass particles milled to the same size but without stearic acid, were compounded on a hot mill at 190° F. to make a 50 percent filled composite material. The filled polyethylene was then fabricated into tensile test specimens and tested using Federal Test Method 1013. The results showed that while the stearic acid coating did not improve tensile strength, a significant improvement in the percent of elongation (14 percent versus 5 percent) was demonstrated by the polyethylene filled with the coated particles over the polyethylene filled with uncoated particles.

EXAMPLE 8

The procedure of Example 7 was carried out using calcium fluoride instead of high alumina glass. Calcium fluoride particles were ball milled for 160 hours with dry stearic acid, the ratio of components being 20 mg stearic acid per gram calcium fluoride. The ball-milled calcium fluoride was then slurried with hexane for 30 minutes and the glass separated by centrifugation. This extraction procedure was repeated three times. Finally the extracted glass was dried at 80° C. for 60 minutes. Following such treatment, the comminuted calcium fluoride particles, their surfaces being coated with stearic acid, resisted wetting by water and by phosphoric acid.

Tests similar to those disclosed in Example 7 were undertaken to evaluate treated and untreated calcium fluoride as fillers for polyethylene. The fabrication and test procedures used to evaluate the calcium fluoride fillers were identical to those disclosed in the work with high alumina glass. A comparison of polyethylene with 50 percent by weight untreated calcium fluoride revealed that such material had substantially the same tensile strength (1,000 psi) and lower percent elongation (10 percent) than polyethylene with 50 percent by weight calcium fluoride coated with stearic acid in the manner described above, the latter having a tensile strength of 1,038 psi and 15 percent elongation.

EXAMPLE 9

Other tests reveal that plastics having different characteristics may be blended with coated inorganic fillers and show significant improvement in physical characteristics over the same plastics blended with uncoated fillers. Thus, polyvinyl chloride has been blended with calcium fluoride (50 percent by weight) as a filler, the calcium fluoride particles being uncoated in one sample and being coated with ethylene glycol in the other.

In preparing the second (coated) sample, the calcium fluoride powder was ball milled 96 hours in the presence of 2 percent (by weight) ethylene glycol. After ball milling, the glass was extracted three times with methanol by a procedure similar to that described in Example 8. The treated filler was then added slowly to slightly plasticized polyvinyl chloride (40 pph dioctylphthalate) in a Brabender blender, the PVC having previously been heated to a temperature of 375° F. Following blending, the mix was then molded in an aluminum mold to form a smooth sample free of voids and bubbles. The same procedure, except for the addition of the ethylene glycol, was used in preparing the sample of PVC filled with unthreated calcium fluoride. The results of compressive strength and elongation tests were as follows:

| Sample | Strength (psi) | Elongation (%) |
| --- | --- | --- |
| PVC filled 50% with untreated $CaF_2$ | 1450 | 54 |
| PVC filled 50% with $CaF_2$ coated with ethylene glycol | 1600 | 108 |

Similar tests with filled thermosetting resins have also shown improved results when the comminuted inorganic fillers were coated by the method of the present invention with organic coating materials such as toluene and bisphenol A dimethacrylate. Unattached toluene was removed by vacuum drying at 100°C/1 mm Hg. The excess bisphenol A dimethacrylate was removed by the exact procedure described above for ethylene glycol. The results are summarized as follows:

| Resin | Filler | | Compressive Strength (psi) | Deflection % | |
| --- | --- | --- | --- | --- | --- |
| | Carrier | Coating | | Yield | Break |
| Crosslinked Acrylic* | Vicor glass (97% $SiO_2$) | bisphenol A dimethacrylate | 17,825 | 4.0 | 4.3 |
| Do. | do. | none | 11,097 | 3.07 | 3.35 |
| Crosslinked Polyester** | do. | toluene | 16,127 | 2.5 | 2.5 |
| Do. | do. | none | 11,702 | 2.7 | 4.2 |

*Tensol cement No. 7, Imperial Chemical Industries, Great Britain
**Resin PM 10B PlasticsMart, Santa Monica, California In all of the above examples, ball milling has been employed for fracturing the inorganic grains or particles and simultaneously coating their freshly exposed surfaces with the organic coating materials. The volume of the charge to the balls used in the mill has been approximately 1 to 1 and the ball mill chamber has been filled to approximately one third of its total volume. The balls have been of a diameter approximately 100 times that of the inorganic grains introduced into the chamber and have been formed of alumina, not only because of its hardness and density but also because of its similarity to the composition of the container, thereby reducing wear and the possibilities of charge contamination. Power-driven parallel rollers have been used to rotate the ball mill containers for the intervals specified.

While in the foregoing we have disclosed various embodiments of the invention for purposes of illustration, it will be understood by those skilled in the art that many of the details disclosed may be varied without departing from the spirit and scope of the invention.

We claim:

1. A process for chemically bonding an organic coating upon inorganic particles, comprising the steps of fracturing, under essentially anhydrous conditions, particles of a frangible inorganic material to form smaller particles having active bonding sites upon the freshly exposed surfaces of fracture thereof; said inorganic material having components bound together by forces of the order of strength of covalent, coordinate and ionic bonds; simultaneously exposing said fresh surfaces as they are formed to albumin capable of bonding to said inorganic material at said bonding sites; continuing said simultaneous fracturing and exposing steps until said particles are reduced to an average size within the range of 0.1 to 200 microns; washing said particles with a solvent for said albumin to remove albumin not immobilized on said particles; and then coupling a biologically active composition to the albumin immobilized on said particles by means of a coupling agent compatible with both said albumin and said composition.

2. The process of claim 1 in which there is the further step of contacting said biologically active composition coupled to said albumin with a substrate reactive therewith.

3. A process for chemically bonding an organic coating upon inorganic particles, comprising the steps of fracturing, under essentially anhydrous conditions, particles of a frangible inorganic material to form smaller particles having active bonding sites upon the freshly exposed surfaces of fracture thereof; said inorganic material having components bound together by forces of the order of strength of covalent, coordinate and ionic bonds; simultaneously exposing said fresh surfaces as they are formed to a proteinaceous organic compound capable of bonding to said inorganic material at said bonding sites; continuing said simultaneous fracturing and exposing steps until said particles are reduced to an average size within the range of 0.1 to 200 microns; washing said particles with a solvent to remove proteinaceous organic material not immobilized on said particles; and thereafter mixing the coated particles with a plastic resin compatible with the proteinaceous organic material immobilized on said particles to secure said resin and particles together by means of said proteinaceous organic material.

4. A process of immobilizing an organic material upon glass particles, comprising the steps of fracturing grains of glass under substantially non-aqueous conditions to form smaller glass particles having highly active bonding sites upon the fresh surfaces of fracture thereof; simultaneously mixing a proteinaceous organic coating material with said glass as it is fractured to expose said fresh surfaces of fracture immediately to said proteinaceous organic coating material and to bond said proteinaceous organic coating material to said particles at said bonding sites; washing the coated glass particles with a solvent for said proteinaceous organic coating material to remove proteinaceous oragnic material not bonded to said particles; and thereafter mixing said coated particles with a plastic resin compatible with said proteinaceous organic coating material to secure said resin and particles together by means of said proteinaceous organic coating material.

5. A process of immobilizing an organic material upon glass particles, comprising the steps of fracturing grains of glass under substantially non-aqueous conditions to form smaller glass particles having highly active bonding sites upon the fresh surfaces of fracture thereof; simultaneously mixing albumin with said glass as it is fractured to expose said fresh surfaces of fracture immediately to said albumin and to bond said albumin to said particles at said bonding sites; washing said particles with a solvent for said albumin to remove albumin not immobilized on said particles; and then coupling a biologically active composition to the albumin immobilized on said particles by means of a coupling agent compatible with both said albumin and said composition.

6. The process of claim 5 in which there is the further step of contacting said biologically active composition coupled to said albumin with a substance reactive therewith.

7. A process for chemically bonding an organic coating upon inorganic particles, comprising the steps of fracturing, under essentially anhydrous conditions, particles of a frangible inorganic material to form smaller particles having active bonding sites upon the freshly exposed surfaces of fracture thereof; said inorganic material having components bound together by forces of the order of strength of covalent, coordinate and ionic bonds; simultaneously exposing said fresh surfaces as they are formed to an enzymatically inactive proteinaceous material capable of bonding to said inorganic material at said bonding sites; continuing said simultaneous fracturing and exposing steps until said particles are reduced to an average size within the range of 0.1 to 200 microns; washing said particles with a solvent for said proteinaceous material to remove proteinaceous material not immobilized on said particles; and then coupling a biologically active compositon to the proteinaceous material immobilized on said particles by means of a coupling agent compatible with both said proteinaceous material and said biologically active composition.

8. The process of claim 7 in which said inorganic particles are formed of glass.

9. A process for chemically bonding an organic coating upon inorganic particles, comprising the steps of fracturing, under essentially anhydrous conditions, particles of a frangible inorganic material to form smaller particles having active bonding sites upon the freshly exposed surfaces of fracture thereof; said inorganic material having components bound together by forces of the order of strength of covalent, coordinate and ionic bonds; simultaneously exposing said fresh surfaces as they are formed to an enzyme to bond said enzyme to said bonding sites without destroying the biological activity of said enzyme; continuing said simultaneous fracturing and exposing steps until said particles are reduced to an average size within the range of 0.1 to 200 microns; washing said particles with a solvent for said enzyme to remove enzyme not immobilized on said particles; and thereafter biologically reacting the enzyme chemically bound upon said particles with an enzymatically reactive material.

* * * * *